United States Patent
Haug et al.

(10) Patent No.: US 10,270,491 B2
(45) Date of Patent: Apr. 23, 2019

(54) POWER-LINE COMMUNICATION SYSTEMS AMD METHODS HAVING LOCATION-EXTENDABLE COLLECTOR FOR END-POINT DATA

(71) Applicant: Landis+Gyr Technologies, LLC, Pequot Lakes, MN (US)

(72) Inventors: Stuart Haug, Hackensack, MN (US); Damian Bonicatto, Pequot Lakes, MN (US); Rolf Flen, Pequot Lakes, MN (US); Robert Zeppetelle, Cumming, GA (US)

(73) Assignee: Landis+Gyr Technologies, LLC, Pequot Lakes, MN (US)

( * ) Notice: Subject to any disclaimer, the term of this patent is extended or adjusted under 35 U.S.C. 154(b) by 0 days.

(21) Appl. No.: 15/692,984

(22) Filed: Aug. 31, 2017

(65) Prior Publication Data

US 2019/0068243 A1    Feb. 28, 2019

(51) Int. Cl.
*H04B 3/54*    (2006.01)
*H04B 3/56*    (2006.01)
*H04L 29/08*   (2006.01)

(52) U.S. Cl.
CPC ............... *H04B 3/56* (2013.01); *H04B 3/542* (2013.01); *H04L 67/12* (2013.01)

(58) Field of Classification Search
CPC ............ H04B 3/56; H04B 3/542; H04L 67/12
See application file for complete search history.

(56) References Cited

U.S. PATENT DOCUMENTS

| | | | |
|---|---|---|---|
| 5,467,011 A | 11/1995 | Hunt | |
| 5,535,240 A | 7/1996 | Carney et al. | |
| 5,581,229 A | 12/1996 | Hunt | |
| 6,341,148 B1 | 1/2002 | Girardeau, Jr. | |
| 6,965,502 B2 | 11/2005 | Duffey et al. | |
| 6,998,963 B2 * | 2/2006 | Flen ...................... | H04B 3/542 340/12.33 |
| 7,102,490 B2 | 9/2006 | Flen et al. | |
| 7,145,438 B2 | 12/2006 | Flen et al. | |
| 7,180,412 B2 | 2/2007 | Bonicatto et al. | |
| 7,224,740 B2 | 5/2007 | Hunt | |
| 7,236,765 B2 | 6/2007 | Bonicatto et al. | |

(Continued)

*Primary Examiner* — Janice N Tieu
(74) *Attorney, Agent, or Firm* — Kilpatrick Townsend & Stockton LLP (57) ABSTRACT

Power-line communication (PLC) systems collect information over power lines from end-point devices respectively associated with customer sites, for assessment by a central processing circuit operated on behalf of a power utility company. In the PLC system, each of a number of PLC data-collector circuits includes a plurality of data interface units and PLC end-point device data computation circuit. Typically, one data interface circuit is located proximate, and another is distal, the location of the computation circuit. Each data interface unit includes a transformer circuit for selectively receiving data from a subset of the end-point devices via the power lines, a transformer-coupling circuit for selectively sending data to the subset of the end-point devices via the power lines, and a high-throughput data driver circuit for outputting data in accordance with a data-transfer protocol which is common to the other high throughput driver circuits which operate in accordance with the data-transfer protocol.

10 Claims, 4 Drawing Sheets

(56) References Cited

U.S. PATENT DOCUMENTS

| | | |
|---|---|---|
| 7,346,463 B2 * | 3/2008 | Petite .................... G08C 17/02 340/870.02 |
| 7,432,824 B2 | 10/2008 | Flen et al. |
| 7,742,393 B2 | 6/2010 | Bonicatto et al. |
| 7,791,468 B2 | 9/2010 | Bonicatto et al. |
| 8,238,263 B2 | 8/2012 | Kohout et al. |
| 8,325,728 B2 | 12/2012 | Zeppetelle et al. |
| 8,428,201 B1 | 4/2013 | McHann, Jr. et al. |
| 8,619,846 B2 | 12/2013 | Johnson et al. |
| 8,675,779 B2 | 3/2014 | Zeppetelle et al. |
| 8,681,619 B2 | 3/2014 | Bonicatto et al. |
| 8,693,580 B2 | 4/2014 | McHann, Jr. |
| 8,693,605 B2 | 4/2014 | Wolter et al. |
| 8,711,995 B2 | 4/2014 | Glende |
| 8,731,076 B2 | 5/2014 | Bonicatto et al. |
| 8,737,555 B2 | 5/2014 | Haug et al. |
| 8,750,395 B1 | 6/2014 | Woodruff et al. |
| 8,762,820 B1 | 6/2014 | Bonicatto et al. |
| 8,811,529 B1 | 8/2014 | Pelletier et al. |
| 8,842,563 B1 | 9/2014 | Duff et al. |
| 8,848,521 B1 | 9/2014 | Duff |
| 8,875,003 B1 | 10/2014 | Wolter et al. |
| 8,958,487 B2 | 2/2015 | Morris et al. |
| 8,989,693 B1 | 3/2015 | Duff et al. |
| 9,019,121 B1 | 4/2015 | Duff et al. |
| 9,037,305 B2 | 5/2015 | McHann, Jr. et al. |
| 9,081,684 B2 | 7/2015 | Haug et al. |
| 9,106,317 B1 | 8/2015 | Johnson et al. |
| 9,106,365 B1 | 8/2015 | Bonicatto et al. |
| 9,148,320 B1 | 9/2015 | Pelletier |
| 9,306,624 B1 | 4/2016 | Wolter et al. |
| 9,369,180 B1 | 6/2016 | Bonicatto |
| 9,461,707 B1 | 10/2016 | Virden et al. |
| 9,525,462 B1 | 12/2016 | Haug et al. |
| 9,647,495 B2 | 5/2017 | Bonicatto |
| 9,667,315 B2 | 5/2017 | Bonicatto et al. |
| 9,729,200 B2 | 8/2017 | Virden et al. |
| 2003/0053553 A1 | 3/2003 | Critchlow et al. |
| 2003/0133473 A1 | 7/2003 | Manis et al. |
| 2005/0017847 A1 | 1/2005 | Bonicatto et al. |
| 2005/0169415 A1 | 8/2005 | Nayak et al. |
| 2008/0146166 A1 | 6/2008 | Khan et al. |
| 2009/0312636 A1 | 12/2009 | Kunita |
| 2012/0063497 A1 * | 3/2012 | Kim, II .................. H04B 3/542 375/222 |
| 2012/0084559 A1 | 4/2012 | Bonicatto |
| 2012/0195355 A1 * | 8/2012 | El-Essawy ............... H04B 3/54 375/222 |
| 2013/0034137 A1 | 2/2013 | Zuckerman |
| 2013/0163683 A1 | 6/2013 | Morris et al. |
| 2014/0036976 A1 * | 2/2014 | Shad ...................... H04B 3/542 375/224 |
| 2014/0064387 A1 | 3/2014 | Bonicatto et al. |
| 2014/0126720 A1 | 5/2014 | Bonicatto |
| 2014/0247892 A1 | 9/2014 | Williams et al. |
| 2015/0067431 A1 | 3/2015 | Haug et al. |
| 2017/0163310 A1 | 6/2017 | Haug et al. |

* cited by examiner

POWER-LINE COMMUNICATION SYSTEMS AMD METHODS HAVING LOCATION-EXTENDABLE COLLECTOR FOR END-POINT DATA

BACKGROUND

Power utility companies use power distribution lines to carry power to customers spanning large geographic areas, typically from one or more power generating stations (or power plants) to residential and commercial customer sites. The power is carried on power distribution lines from the power plants at relatively high voltages and using alternating current (AC). Substations are commonly located near the customer sites to provide a step-down of the high voltage to a lower voltage (e.g., using transformers). Power distribution lines carry this lower-voltage AC from the substations to multitudes of customer sites at which endpoint (e.g., power-consumption metering) devices are installed to monitor and report on the power consumed at each site.

Service providers utilize such power distributed networks to provide data-communication services to customers over the same large geographic areas over which the power utility companies provide power. While the power plants (or power-generating stations) use alternating current (AC) to transmit power over long distances via the power distribution lines, service providers communicate (send and/or collect) power-related informational data with consumers of the distributed power and also communicate control/configuration data with equipment which may be switching and/or drawing power from the power distributed networks. Long-distance transmission can be accomplished over a relatively high voltage.

Communications providers are among such service providers which may utilize distributed communications networks to provide communications services to customers. Similarly, power companies utilize a network of power lines, meters, and other network elements to provide power to customers throughout several geographic regions and to receive data from customer locations including, but not limited to, data representing metered utility usage. A system can provide these reporting functions using a set of data-collecting devices (collectors) that are designed to communicate with nearby endpoint devices. However, data communication between a command center, collectors and many thousands of endpoint devices over power distribution lines can be a particularly challenging issue. The sheer number of endpoint devices contributes to a host of issues including endpoint processing power, memory size, endpoint cost, interference from AC power and other concerns. For instance, digital signal processing of communications between the devices can be complicated by these and other factors.

SUMMARY

Aspects of the present disclosure are directed to addressing the above-discussed aspects as well as others which will become apparent based on the detailed description that follows. According to one embodiment of the present disclosure, aspects are directed to apparatuses (e.g., systems and devices) which are configured to manage, assess and/or communicate data involving equipment and communication devices working with customer power-consumption sites which are powered by utility power.

Consistent with various embodiments of the instant disclosure, a power-line communication (PLC) apparatus collects information provided over power lines from a plurality of communication devices respectively and communicatively associated with a plurality of customer sites. This collection of data is used for assessment by a central processing circuit operated on behalf of a power utility company. In such embodiments, the PLC data-collector circuit comprises a plurality of data interface units and a PLC end-point device data computation circuit which includes high-throughput data reception circuits configured to receive data from each of the plurality of data interface units in parallel via the high-throughput data reception circuits and in accordance with a data-transfer protocol used by each interface circuit. One or more of the interface circuits is configured and arranged to operate at a location that is remote from the plurality of customer sites and also remote from the location at which the computation unit is situated. By communicatively coupling each of the plurality of communication devices over the power lines and communicating PLC data via the plurality of data interface units at dispersed locations using the high-throughput data reception circuits in accordance with the data-transfer protocol, overall system throughput across broad geographic areas, and control of peripheral power-line coupled equipment, can be more readily realized.

One particular embodiment involves a power-line communication (PLC) apparatus for collecting information, for assessment by a power utility company, over power lines connecting to a plurality of customer sites. The apparatus is implemented in the form of a system which includes a plurality of communication devices respectively and communicatively associated with the plurality of customer sites, a central processing circuit configured and arranged on behalf of the power utility company to collect information derived from the data sent over the power lines from each of the plurality of communication devices, and a remoteable data-collector circuit including a plurality of data interface units which can be strategically placed at locations in and around locations serviced by the power lines. Each of the plurality of communication devices is configured and arranged to operate by power received over the power lines at the associated customer site, and to communicate data over the power lines via a customer-site transformer. The central processing circuit is configured and arranged to collect information derived from the data sent over the power lines from each of the plurality of communication devices by using a broadband communication network for carrying the collected information. The data interface units are configured as part of the remoteable data-collector circuit with a transformer circuit for selectively receiving data from a subset of the plurality of communication devices via the power lines, with a transformer-coupling circuit for selectively sending data to the subset of the plurality of communication devices via the power lines, and with a high-throughput data driver circuit for outputting data in accordance with a data-transfer protocol. The data-transfer protocol is common to each of multiple high throughput driver circuits within each data interface unit.

A PLC end-point device data computation circuit, which can also be configured as part of each remoteable, or location extendible, data-collector circuit, includes a plurality of high-throughput data reception circuits and configured and arranged to operate at a location that is remote from the plurality of customer sites. The computation unit is communicatively coupled to each of the plurality of communication devices over the power lines via the plurality of data interface units, to receive data from each of the plurality of data interface units in parallel via the high-throughput data reception circuits and in accordance with the data-transfer protocol, and communicates data with and sends the collected information to the central processing unit via the broadband communication network.

These and other aspects of the present disclosure are exemplified in a number of illustrated implementations and applications, some of which are shown in the figures and characterized in the claims section that follows. The above summary is not intended to describe each illustrated embodiment or every implementation of the present disclosure. The figures and detailed description that follow, including that described in the appended claims, more particularly describe some of these embodiments.

BRIEF DESCRIPTION OF FIGURES

Various example embodiments may be more completely understood in consideration of the following detailed description in connection with the accompanying drawings, in which.

While the disclosure is amenable to various modifications and alternative forms, examples thereof have been shown by way of example in the drawings and will be described in detail. It should be understood, however, that the intention is not to limit the disclosure to the particular embodiments shown and/or described. On the contrary, the intention is to cover all modifications, equivalents, and alternatives falling within the spirit and scope of the disclosure.

DETAILED DESCRIPTION

Aspects of the present disclosure are believed to be applicable to a variety of different types of devices, systems and arrangements, including those that may be implemented for customers which subscribe to one or more services for receiving power generated and/or provided by a power utility company and to one or more services for communicating data over the power lines or via a broadband communication network. While the present disclosure is not necessarily limited to such applications, various aspects of the disclosure may be appreciated through a discussion of various examples using these contexts.

According to certain embodiments which are consistent with the present disclosure, aspects are directed to manners and locations in which receiver circuits are configured and arranged to process communication signals that are received over the power distribution lines which carry power using alternating current (AC). While the receiver circuits can be configured to process received signals using the AC as a timing reference, it is appreciated that there are various complexities involving use of this power-line communications (PLC) medium. For instance, due to the AC line frequency being subject to significant fluctuations in frequency, the data reception circuits (receivers) typically compensate for these fluctuations by making appropriate adjustments to the signal processing. Moreover, the PLC medium is taxed by significant bandwidth demands as data is received around the clock from multitudes of endpoint devices often involving communication and control of metered power usage throughout large regions and including both populated cities and relatively unpopulated rural areas. These and other issues, are addressed at the ground level by implementing the PLC system by way of receiver circuitry that processes received signals in the digital domain. In particular embodiments, the signal processing can be benefited from use of a fast Fourier transform (FFT) to allow the signals to be represented in the frequency domain. The FFT algorithm can be designed to match the channel frequencies used by the transmitter which sends the data over the power lines. For instance, the transmitted signals can be used to track the AC line frequency in certain embodiments. For instance, a given frequency channel can be determined by using the AC line frequency as a reference signal or clock. In this instance, the frequency channel has a center frequency that would vary as the frequency of the AC line varies. This can be particularly useful for filtering harmonics that might be caused by the power-providing AC. This AC frequency, and resulting harmonics, can vary about an ideal frequency of about 60 Hertz (Hz) in the United States and around 50 Hz in Europe. These standard frequencies, however, are relatively arbitrary (e.g., defined by a standard that could be changed in the future) and do not necessarily limit the various embodiments discussed herein. For further information regarding these and related aspects of data transfer and processing over the PLC medium, reference may be made to U.S. Pat. No. 8,737,555 and U.S. Pat. No. 9,525,462; each of these patent documents names as the first inventor Stuart L. Haug et al. and is assigned to the assignee of the instant patent document, and each is incorporated by reference generally and also specifically for its teaching concerning the disclosed manners of signal processing of signals and data as received/collected/processed, for example, with discernment of information carried by data blocks based on combining energy of aligned signals.

Addressing the above and other issues associated with communicating data over PLC mediums, particular embodiments of the present disclosure are directed to a PLC data-collector circuit being encased as a subsystem in a protective environment-shielding housing at a base location. As non-limiting examples, this location may be near a segment of the system's power lines such as at substation wherefrom power is distributed to power-consuming facilities or at a stand-alone location where data is simply collected for processing. The PLC data-collector circuit includes front-end circuitry and computation circuitry. The front-end circuitry is implemented as a set of data interface units, each including a transformer circuit and analog-digital signal conversion circuits for selectively receiving and converting analog data from associated subsets of the many endpoint communication devices (being served via the power lines) to digital data for processing by the computation circuitry. In the set, each of the plurality of data interface units includes an associated high-throughput data driver circuit (e.g., a microcomputer with an output interface) for processing the received and converted data for transmission, in accordance with a data-transfer protocol, to the computation circuitry, and in a typical implementation, one or more other of the plurality of the data interface units is configured to be located proximate the housing such as inside the housing and co-located with the computation circuit (thereby considered physically integrated with the PLC data-collector circuit), while at least one of the plurality of the data interface units is configured to be remotely located relative to the housing such as at a location along the power lines but sufficiently remote from the computation circuit that a long-range communications channel is needed for a high-throughput bandwidth for communications between the distal data interface unit(s) and the computation circuit. Example distances therebetween might be several feet, 50 feet, 90 feet or in some instances accommodated by certain data communications channels, as far as several miles away.

While not necessarily being limited to the above type of exemplified PLC systems, such embodiments with the data interface unit(s) being distal or remoteable relative to the computation circuit, can advantage various aspects of PLC systems. These aspects include, for example, the above-noted fluctuations in AC line frequency and the bandwidth requirements for communicating such PLC data over such PLC mediums, and the ability to communicate effectively in and around PLC-serviced regions without undue material and/or labor costs. Accordingly, aspects of the present disclosure are directed to a data receiving and processing circuitry in a data-collecting device (collector) that is configured and arranged to lock its signal processing (e.g., an FFT algorithm) closely enough to the power-line frequency for the related complex data demodulation of the data received. The ability to effectively and efficiently lock can be particularly useful for enabling a large number of densely-packed frequency channels in a limited bandwidth, wherein data throughput is intense and relatively constant and wherein the individual channel frequencies are held to extremely tight tolerances.

Accordingly, with the PLC data-collector circuit implemented with its data interface unit(s) being strategically located inside and outside of the housing which encases the PLC data-collector circuit, the data interface units (inside and outside the housing) can send the data they receive from the PLC lines in the appropriately-processed form of data (discussed below) via driver circuits to the computation circuit, thereby permitting the computation circuit optimize processing of this data as it is received or streamed in from many of the data interface units which, in turn, process data received from multitudes of endpoints (e.g., facility-installed metering circuits). To accommodate this volume of data, the PLC data-collector circuit incorporates high-throughput communications channels for conveying data from each of the plurality of data interface units. These communications channels extend from the respective high-throughput driver circuits which are integral with each of the data interface units, to high-throughput receiver circuits which form part of, or are integrated with, the computation circuit.

The medium(s) of the communications channels and protocol(s) for carrying the data depend on system-implementation specifications. Such specifications can include, for example, the distances needed to accommodate the communications channels, the potential amount of data feeding the remote/distal interface units, the number of endpoints (e.g., facility-installed metering circuits) to be respectively (communicatively-) coupled to the remote/distal interface units, and the degrees to which data processing of the PLC signals are to be processed by the respective front-end portion (the interface units) and backend portions (the computation circuit) of the PLC data-collector circuit.

By locating the data interface units both inside and outside of the PLC data-collector circuit in this manner, significant advantages have been discovered in connection with the present disclosure. Among others and depending on the embodiments implemented for a given system application, these advantages can permit for a way to increase signal-to-noise aspects of the system to allow for better reception, a reduction of bandwidth requirements by optimizing the processing of data received at the respective locations of the data interface units, and permitting for control and/or communications interfaces with equipment that is typically used for needs which are adjacent to the localized installation of the data interface unit(s) outside the housing.

Figure 1:
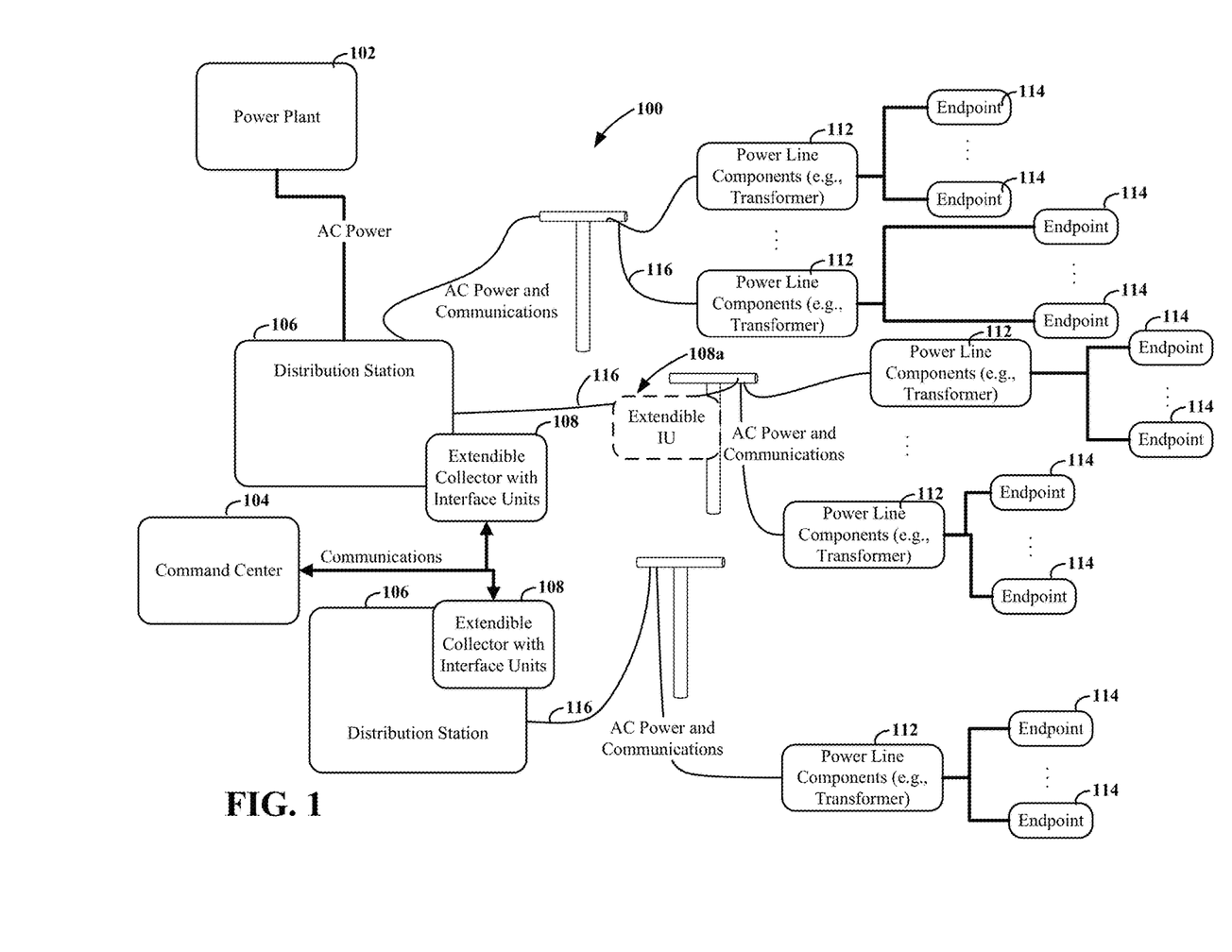
FIG. 1 is a block diagram of an example power line communication system in which endpoints (a.k.a. circuit-based endpoint devices) communicate data with collector units which have location-extendible circuit configurations, consistent with embodiments of the present disclosure.
Figure 2:
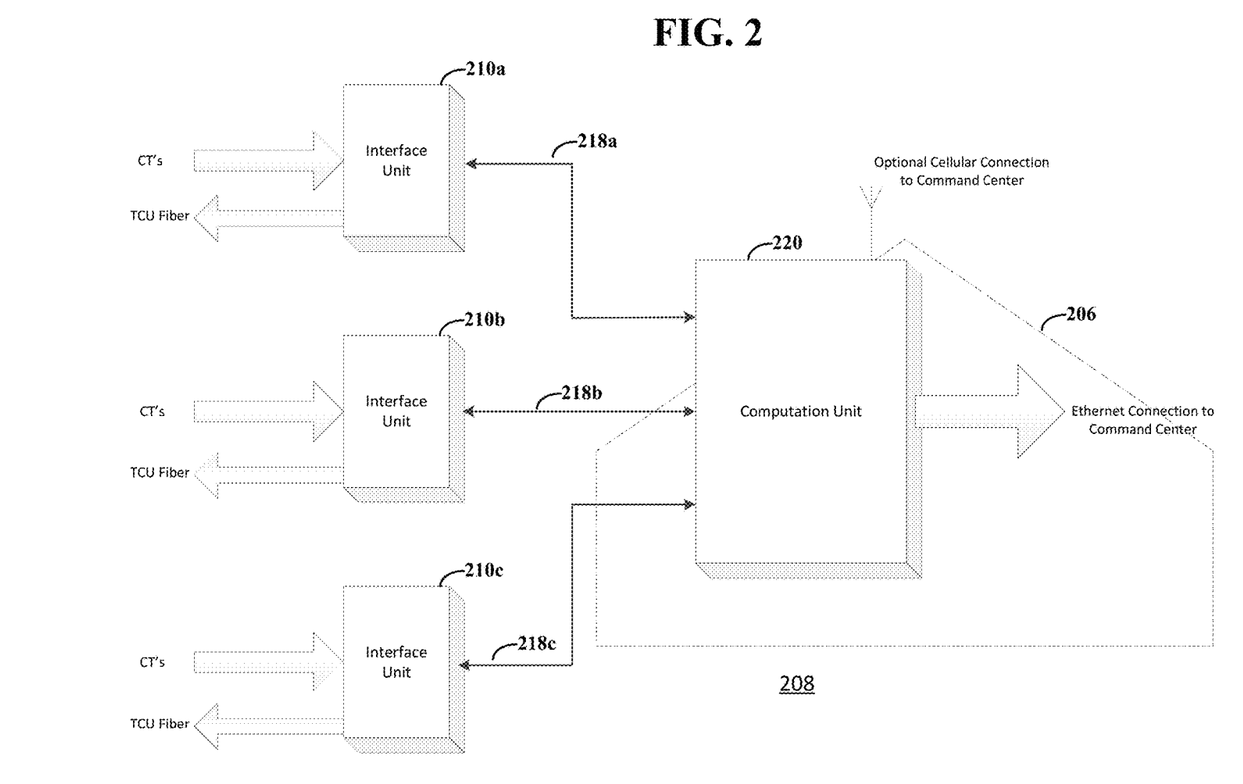
FIG. 2 further depicts a block diagram of an example collector unit in which a location-extendable circuit configuration is arranged as part of a power line communication system for communication of data with endpoints, consistent with embodiments of the present disclosure.

Consistent with embodiments of the instant disclosure, FIGS. 1 and 2 are block diagrams of an example power line communication system in which endpoints (a.k.a. circuit-based endpoint devices) communicate data with PLC collector units which have location-extendible (or remoteable) interface circuits. FIG. 1 is a more general depiction showing a PLC system 100 operating relative to a power plant 102 by way of a command center 104 (e.g., a CPU/server) programmed for communicating with PLC collector units 108. Power distribution stations depicted as 106 are also shown with the power lines 116 which are integral with the PLC system 100. Also according to embodiments of the present disclosure, FIG. 2 further depicts an example collector unit, in the form of a block diagram, with a location-extendable circuit configuration that is arranged as an important part of both the PLC system 100 and the PLC collector units 108.

More specifically and with particular reference to FIG. 1, the PLC system 100 includes a communications network implemented, at least in part, using a power distribution system. Illustrated aspects of the power distribution system include the utility (power) company 102 which generates the AC power for distribution via various geographically-dispersed distribution stations 106, for consumption at the facilities of customer sites where respective sets of equipment 114 are located. The equipment 114 operates based on the power received over the power lines 112. In this illustrated example, the equipment 114 at each customer site includes an endpoint device (which is or at least includes a circuit, such as a power meter and/or load switch) installed at the customer site facility. In such a PLC-type system, the endpoint devices are typically also configured with circuitry for receiving configuration and other data from the collectors 108 (e.g., located in proximity to a grouping of nearby customer sites) and for sending back reports and status information to the collectors 108, which is in turn sent back to a computer server associated with command center 104 operated on behalf of the utility (power) company 102. In such PLC systems, this information is sent in both directions, between the collectors 108 and the equipment or endpoint 114, over the power lines. The command center's computer server refers to and/or includes one or multiple computers (processing circuit) operating together to carry out the communications as depicted and described herein.

Although not shown in FIG. 1, the communications channels used by the PLC system 100 might also include broadband communications network ("BBN" such as cellular networks, digital subscriber line (DSL) connectivity or the Internet) implemented for various communications such as between the command center (e.g., a computer server) 104 and certain circuits which form part of the collector units 108.

The general data communications are generally depicted in FIG. 1, by way of the command center 104, the endpoints 114 and the collector units 108, on behalf of the power distribution company (e.g., operating the power plant 102). Once configured via the command center 104, endpoints 114 transmit symbols over respective communications channels to collector units 108. In certain embodiments, the endpoints 114 can be located at customer locations (e.g., buildings). Power-line (current or voltage) transformers 112 are often located near groups of customer sites, via substations/collector housings, to provide a step-down in voltage before the AC power is provided to the customer sites. The collector circuits (shown as units 108) can include circuitry specially configured to communicate with the command center 104 in the form of dedicated wired/wireless channels whether as a high-speed network interface, wide-area network (WAN), Ethernet, local area network (LAN), the Internet, cellular network, DSL-based wired network, and/or other communication networks including free-space fiber networks, and optic materials and waveguides.

In certain embodiments of the present disclosure, the collector units 108 are configured to receive data from many different sets of equipment 114 while storing the data in a local database. The collectors units 108 may be operated by the manufacturer of the communication devices (as exemplified herein), and/or by a third party service provider in communication with the manufacturer. A collector 108 can also take action based on the data received from the endpoints 114 and transmit data received from the sets of endpoints 114 to the command center 104. A collector 108 can also represent a separate server as compared to the server operated on behalf of the manufacturer(s). For example, in a PLC implementation such as shown in FIG. 1, the command center 104 can receive data indicating conditions suggestive of data being received at poor quality levels from different equipment coupled to the PLC lines, whether endpoints 114 or other types of equipment.

In this scenario and using the above discussed features as disclosed herein, the command center 104 can configure those collector units 108 implemented with interface unit(s) being remotely located along the power lines (e.g., 108a), so that they collect data by combining energy corresponding data as received from differently-located interface unit(s) in an attempt to improve the signal quality conditions in the signals received from the endpoints 114. In one exemplary implementation, such signal-quality improvement can be addressed in a PLC system configuration wherein symbols from a particular endpoint are transmitted at specifically-allocated times/frequencies to avoid data collisions on the power lines, over any one of thousands of communications channels in the system.

In one such example system, each endpoint is assigned a particular channel using orthogonal frequency-division multiple access (OFDMA) or another channel allocation technique. Channel assignments for the endpoints 114 can be stored, for example, in a communications database that is accessible to the collectors 108. Consistent with embodiments of the present disclosure, each collector 108 can be configured to be in communication with thousands of endpoints 114 and there can be thousands of collectors 108 communicating with the command center 104. For example, a single collector can be configured to communicate with over 100,000 endpoint devices (e.g., power meters and load switches) at customer sites and a command center can be configured to communicate with over 1,000 collectors. Thus, there can be millions of total endpoints and many thousands of these endpoints can be considered region-specific or neighbor endpoints (many or all co-located with broadband-enable devices) for communications to the same collector over a shared power distribution line.

In this context, signal quality can be improved by with each of multiple separate communication channels assigned for communication by one (or more) of the plurality of endpoints, with at least one data symbol being communicated by transmitting the data symbol over the multiple communications channels. Transmissions of the data symbol via the separate communication channels may be performed concurrently, overlapping, and/or sequentially in time. For those collector units 108 implemented with interface unit(s) being remotely located along the power lines, each such interface unit receives multiple versions of the data symbol and then, whether at one of these interface units or at the computation circuit, these versions of the data symbol are effectively combined to improve the signal to noise ration. As noted above, this can be achieved by combining energy corresponding to the data as received from differently-located interface unit(s) over respective ones of the communication channels in an attempt to improve the signal quality conditions in the signals received from the endpoints 114. If excessive noise is present in one or more of the communication channels, the received data symbols may be in error. However, by implementing certain interface units remotely located along the power lines, the processing apparatus (e.g., the computation unit) combines energy from the aligned data symbols and discerns the true data from the communication signals that are received over the communication channels. The processing apparatus provides the discerned data in the form of an output data symbol. The data communication circuitry can align the phases of the received data symbols per a common reference point as known in such PLC systems. The processing apparatus is thus configured to combine energy of the aligned data symbols and determine a third data symbol from the combined energy; should this third data symbol be discerned (decoded as being valid), the collector unit 108 uses this third data symbol for purposes reporting to the command center 104.

In some embodiments, the command center 104 can instruct that additional data symbols be retransmitted and/or that an interface unit be re-located/installed near a specific region of endpoints, if a data symbol cannot be discerned from the combined energy of a first set of concurrently received data symbols. Energy of the retransmitted symbols and first set of data symbols may be combined and used to recover an error-free data symbol. In some implementations, retransmissions are performed individually for each symbol received in error. In some other implementations, a group of different data symbols (e.g., a data packet) may be retransmitted in response to any symbol in the group of data symbols being received in error. These and other data symbol discernment embodiments may utilize different schemes for recovery of the true data symbols which are received in error. In some embodiments, each transmission/retransmission includes a single instance of the data symbol to be transmitted. In some embodiments, each transmission/retransmission again concurrently transmits multiple instances of a data symbol over respective separate communication channels and from respectively-located interface units, whether from the same collector unit or different collector units. In some embodiments, the number of instances of the data symbol included in each transmission and/or retransmission may be adjusted based on the amount of noise in a particular environment. In some implementations, such an adjustment may be performed based on various indicators of channel conditions including but not limited to error rate and/or signal to noise ratio (SNR). Accordingly, by taking advantage of collector units 108 implemented with interface unit(s) being remotely located along the power lines, each of the multiple data symbols used for transmission/retransmission can be modulated with the same encoding scheme and phase aligned with the other data symbols (to be combined) per a common reference point (e.g., beginning of symbols or end of symbols). This approach can be modified by changing the modulation by attempting to mitigate the signal's susceptibility to noise, so long as the transmission and retransmission of the data symbols are sent using the same modulation scheme.

Consistent with certain embodiments, those interface unit(s) which are remotely located along the power lines, can provide a remotely-located interface through which other equipment can be controlled and/or data accessed therefrom. For example, such other equipment might include one or more of the following: a load switch, a PLC power meter, capacitor bank, switch actuator, circuitry configured to monitor switch positions, circuitry configured to provide meteorology reports including at least one of temperature, pressure, wind velocity and rain, area lighting, circuitry configured to monitor physical security, load shedding, and circuitry configured to monitor power quality. For such equipment, the command center (104 of FIG. 1) and/or other authorized communicatively-connected computer tools can generate and send control signals, or relay such signals from other devices, for controlling, or obtaining data from, the above-listed circuitry/equipment. Another example of such circuitry/equipment includes test circuitry which is designed in a manner similar to aspects of the computation circuit in the collector unit 108 to mimic, independently, functionality and/or efficacy of placement of the distal interface unit(s). The collector units 108, and such test circuitry, can communicate with the command center 104 over various pathways as discussed above.

As noted above, within each collector unit 108 one or more of the interface units can be installed at remote locations, such as a few feet away to miles away from the installation and/or housing 206 of the PLC data-collector circuit. In the block diagram of FIG. 2, an exemplary PLC data-collector circuit 208 (corresponding to collector unit 108 of FIG. 1) is shown with similarly-constructed interface units 210a, 210b, 210c, etc. Also forming part of the PLC data-collector circuit 208 and connecting to each interface unit is an internal high-throughput driver circuit for sending data to a respective one of the high-throughput receiver circuits illustrated at the other end of each communication (e.g., Ethernet or universal serial bus (USB)) channel 218a, 218b, 218c for feeding the data to the computation circuit or unit 220. Each such communication channel (e.g., 218a) can also be used to send data and control commands from the computation unit 220 (e.g., on behalf of the command center) to the associated interface units (e.g., 210a). Depending on the location, the high-throughput driver circuits are configured to send the data to the computation circuitry of the PLC data-collector circuit over a communications channel which is deemed acceptable for the system-application specifications. For such high-throughput transmissions, these communications channels might include and embrace, for example, DSL or asymmetric digital subscriber line (ADSL) network, cable communication network, and cellular telephony network, Ethernet, and Internet via a wireless or wired coupling network. In some instances, the type of communications channel might also depend on the type of equipment being used for the needs which are adjacent to the localized installation of the data interface unit(s). Such equipment and the related control signals for such equipment are discussed above.

Also shown in FIG. 2 are current transformers (CT) and transformer coupling units (TCUs) using fiber connectivity. The example collector unit in FIG. 2 can also be implemented, as an optional alternative connection point, with modem circuitry (not shown) in each interface unit such as 210a and/or the computation unit 220. In such high data throughput environments, the computation unit 220 can be implemented as one of many different types of computer arrangements including general-purpose computers and/or digital signal processors specialized for executing Fourier transform algorithms as may be appropriate depending on the extent to which the computation unit 220, as opposed to the interface units are unpacking raw or partially-processed data received over the power lines. Also, each of the interface units can include a termination circuit at which the current transformer circuits and the transformer-coupling circuits connect for communications with a corresponding subset of the endpoints (communication devices such as power meters).

As noted above, certain embodiments permit for one or more of the interface units 210a, 210b and 210c being constructed, as an optional feature, with each such interface unit being constructed in the same manner and thereby permitting any of the interface units to be located inside (proximal) or outside (distal) the enclosure or housing (protecting the collector unit's computation circuit and any other interface units which may be internally configured). Consistent with such embodiments, FIG. 3 depicts an expanded block diagram of an example manner for constructing such an interface unit.

Figure 3:
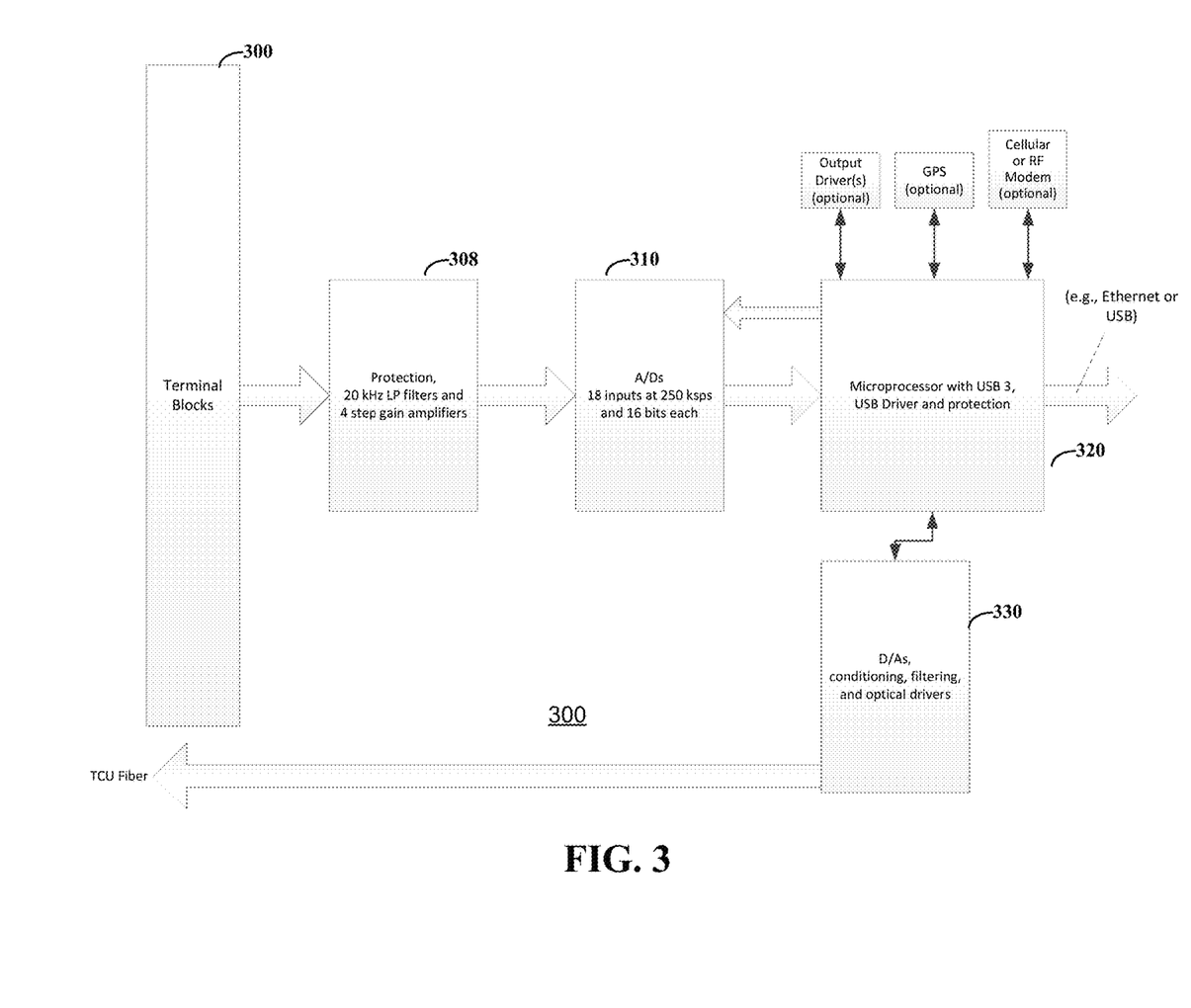
FIG. 3 depicts an expanded block diagram of an interface unit consistent with the example collector unit of FIG. 2, consistent with embodiments of the present disclosure.

As shown in FIG. 3, the interface unit 300 can include front-end analog signal circuitry 308, such as 20 kilohertz (kHz) filters and multiple step amplifiers, configured and arranged to prepare analog signals, as picked up at terminal blocks 310, carrying the data from a corresponding subset of the many communication devices in the PLC system. The interface unit 300 further includes an analog-digital conversion circuit 312 configured and arranged to convert a dozen or more inputs in parallel to corresponding output streams of data, and yet further includes a microcomputer 320 configured and arranged to receive and process the output streams of data for outputting the data, via a high-throughput data driver circuit (internal to the microcomputer 320), in accordance with a data-transfer protocol which can be correspondingly designed to receive and process the digital data according to the manner in which and the extent to which the interface unit is programmed to process the data received from the power lines. The interface unit 300 can include an digital-analog conversion circuit 330 configured and arranged to convert information from digital form to analog form for sending such information (e.g., over a TCU fiber interface) to another part of the PLC system.

Figure 4:
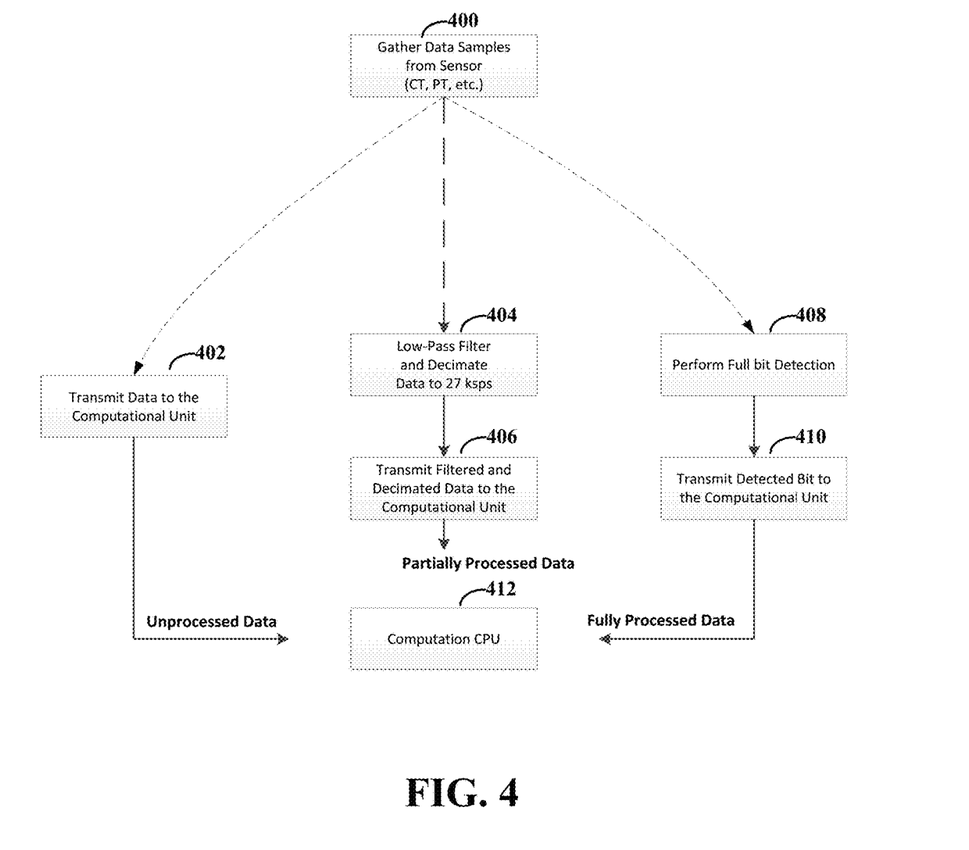
FIG. 4 depicts a flow diagram exemplary manners, also consistent with the present disclosure, by which data collected from the power lines may be processed by the interface units characterized in connection with the embodiments discussed in connection with FIG. 2 and/or FIG. 3.

FIG. 4 depicts three exemplary manners, in the form of a single flow diagram, by which data, in its raw form, collected from the power lines may be processed by the interface units and/or the computation circuit, each as characterized for example, in connection with the embodiments discussed in connection with FIGS. 1, 2 and/or FIG. 3. At block 400, data samples can be gathered from an end-point device such as a sensor. Examples of the sensor include but are not limited to current transformers (CTs) and potential (voltage) transformers (PTs). The data samples can be processed in various manners depending on whether the data samples have previously been processed. As illustrated in FIG. 4, the data samples can be transmitted to the computation circuit in three different styles of data streams.

At block 402, a first data stream including unprocessed (raw) data of the data samples can be transmitted to the computational circuit (e.g., 220 of FIG. 2) at block 412. Unprocessed data can include data that has not been decimated. The computation circuit can perform bit detection on the unprocessed data. The unprocessed data is visible to the computational circuit at the cost of the high bandwidth needed to transmit the unprocessed data.

At block 404, a second data stream including partially processed data of the data samples can be filtered by the interface units (e.g., 210a). For example, the partially processed data can be input to a low-pass filter of the interface units. Partially processed data can include data that has been decimated before for bit detection. The filtered data can then be decimated, for example, to 27 kilo samples per second (ksps). At block 406, the filtered and/or decimated data can be transmitted to the computation circuit at block 412. The computation circuit can perform bit detection on the filtered and decimated data. Advantageously, the signal combination can be improved with a reduced bandwidth as compared to unprocessed data. However, a significant amount of bandwidth is needed to transmit the partially processed data to the computational circuit.

At block 408, the interface units can perform full bit detection on a third data stream including fully processed data of the data samples. Fully processed data can include data that has already been decimated to, for example, 27 ksps. At block 410, the detected bits of the fully processed data can be transmitted to the computation circuit at block 412. Transmitting the detected bits uses much less bandwidth as compared to the unprocessed data or the filtered and/or decimated data. However, signal quality information may be lost unless statistics are transmitted to the computational circuit with the detected bits.

At block 412, the computational circuit can combine energy corresponding to bits from each of the three data streams. By combining the energy from the first two of the illustrated data streams, the signal quality of signals represented by the energy can be improved for discernment of the bits of the three data streams.

Unless otherwise indicated, various general purpose systems and/or logic circuitry may be used with programs in accordance with the teachings herein, or it may prove convenient to construct a more specialized apparatus to perform the required method. For example, according to the present disclosure, one or more of the methods can be implemented in hardwired circuitry by programming a general-purpose processor, other fully or semi-programmable logic circuitry, and/or by a combination of such hardware and a general-purpose processor configured with software. As another example, it will be appreciated that the term communication devices refers to and/or includes circuits enabled to communicate other devices, for example over the illustrated broadband network, such as WiFi and/or cellular enabled devices such as smart thermostats, smart water heaters and the like. For example, WiFi/cellular enabled devices may include a desktop CPU, tablet, smart phone, etc. Accordingly, the various components and processes shown in the figures can be implemented in a variety of circuit-based forms, such as through the use of data processing circuits (operative by circuit components alone or in combination with configuration/software data, otherwise known as "modules").

It is recognized that aspects of the disclosure can be practiced with computer/processor-based system configurations other than those expressly described herein. The required structure for a variety of these systems and circuits would be apparent from the intended application and the above description. Further, it is appreciated that various terms used in the instant disclosure are known to those knowledgeable in the art to describe aspects relating to one or more of circuits to implement certain circuit-based logic, data communications and related protocols, applications and the like. Such techniques include the description of computation for signal processing expressed in terms of an algorithm or mathematical expression, such as Fast-Fourier Transform (FFT). While such techniques may be implemented, for example, by executing code on a computer, the expression of that technique may be conveyed and communicated as a formula, algorithm, or mathematical expression. For the purposes of this document, each of the terms endpoint, endpoint device and communication device refers to and/or includes circuits enabled to communicate, for example over the described communication network, whether PLC, WiFi, Internet, cellular enabled etc. As just one example, a WiFi/cellular enabled communication device (e.g., endpoint or modem device) may include a microcomputer, memory for executing a computer program, a programmable logic array and/or data-communication driver circuitry as is common in variety of known circuits including desktop CPUs, tablets, smart phones, and communications equipment commercially available from the instant assignee, Landis+Gyr (operating in Minnesota and elsewhere).

In certain embodiments, machine-executable instructions are stored for execution in a manner consistent with one or more of the methods of the present disclosure. The instructions can be used to cause a general-purpose or special-purpose processor that is programmed with the instructions to perform the steps of the methods. The steps may be performed by specific hardware components that contain hardwired logic for performing the steps, or by any combination of programmed computer components and custom hardware components.

In some embodiments, aspects of the present disclosure may be provided as a computer program product, which may include a machine or computer-readable medium having stored thereon instructions which may be used to program a computer (or other electronic devices) to perform a process according to the present disclosure. Accordingly, the computer-readable medium includes any type of media/machine-readable medium suitable for storing electronic instructions.

The various embodiments described above are provided by way of illustration and should not be construed to necessarily limit the disclosure. Based on the above discussion and illustrations, those skilled in the art will readily recognize that various modifications and changes may be made to the present disclosure without strictly following the exemplary embodiments and applications illustrated and described herein. For instance, such changes may include variations on particular circuits and/or software code to implement one or more of the various modules. Such modifications and changes do not depart from the true spirit and scope of the present disclosure, including aspects set forth in the following claims.

What is claimed is:

1. A power-line communication (PLC) apparatus for collecting information, for assessment by a power utility company, over power lines connecting to a plurality of customer sites, the apparatus comprising:
   a plurality of communication devices respectively and communicatively associated with the plurality of customer sites, each of the plurality of communication devices configured and arranged to operate by power received over the power lines at the associated customer site, and to communicate data over the power lines via a customer-site transformer;
   a central processing circuit configured and arranged, on behalf of the power utility company, to collect information derived from the data sent over the power lines from each of the plurality of communication devices, by using a broadband communication network for carrying the collected information; and
   a remoteable data-collector circuit including:
      a plurality of data interface units, each of the plurality of data interface units including a transformer circuit for selectively receiving data from a subset of the plurality of communication devices via the power lines, including a transformer-coupling circuit for selectively sending data to the subset of the plurality of communication devices via the power lines, and including a high-throughput data driver circuit for outputting data in accordance with a data-transfer protocol, the data-transfer protocol being common to high throughput driver circuits of each of the plurality of data interface units; and
      a PLC end-point device data computation circuit including a plurality of high-throughput data reception circuits and configured and arranged to operate at a location that is remote from the plurality of customer sites, to be communicatively coupled to each of the plurality of communication devices over the power lines via the plurality of data interface units, to receive data from each of the plurality of data interface units in parallel via the high-throughput data reception circuits and in accordance with the data-transfer protocol, and to communicate data with and send the collected information to the central processing circuit via the broadband communication network.

2. The PLC apparatus of claim 1, further including a case configured for housing the PLC end-point device data computation circuit along with at least one of the plurality of data interface units, wherein another of the plurality of data interface units is located at least ninety feet from the location of the PLC end-point device data computation circuit.

3. The PLC apparatus of claim 1, wherein respective locations of the plurality of data interface units are configured and used by the central processing circuit to generate and output a report, for or on behalf of the power utility, which identifies one or more respective regions of customer sites associated with a possible power outage event.

4. The PLC apparatus of claim 1, wherein the plurality of data interface units are configured for processing data with at least one of the plurality of data interface units being located away from the location of the PLC end-point device data computation circuit with the data-transfer protocol characterized in that the at least one of the plurality of data interface units transmits data, received or derived from one or more of the subset of the plurality of communication devices via the power lines, to the computation circuit as data which is not decimated for data bit detection, and wherein the computation circuit includes circuitry configured and arranged to provide decimation for data bit detection of the data transmitted from the at least one of the plurality of data interface units.

5. The PLC apparatus of claim 1, wherein the plurality of data interface units are configured for processing data with at least one of the plurality of data interface units being located away from the location of the PLC end-point device data computation circuit with the data-transfer protocol characterized in that the at least one of the plurality of data interface units transmits data, received or derived from one or more of the subset of the plurality of communication devices via the power lines, to the computation circuit as data which is filtered and decimated for data bit detection, and wherein the computation circuit includes circuitry configured and arranged to detect data bits from the data transmitted from said at least one of the plurality of data interface units.

6. The PLC apparatus of claim 1, wherein the plurality of data interface units are configured for processing data with at least one of the plurality of data interface units being located away from the location of the PLC end-point device data computation circuit with the data-transfer protocol characterized in that the at least one of the plurality of data interface units include circuitry configured and arranged to process the data received via the power lines by filtering, providing signal decimation and in response detect data bits therefrom, and to transmit the detected data bits to the computation circuit.

7. The PLC apparatus of claim 1, wherein the plurality of data interface units are configured for processing data with one of the plurality of data interface units which, when installed at a location away from the location of the PLC end-point device data computation circuit, is configured to transmit specific bits of data to the computation circuit, and another one of the plurality of data interface units is configured to transmit the same specific bits of data to the computation circuit, and wherein the computation circuit is configured and arranged to combine energy corresponding to the specific bits as received from each of said one and said another of the plurality of data interface units, and by combining energy therein improves signal quality of signals represented by the energy for discernment of the specific bits.

8. A method for collecting information, for assessment by a power utility company, over power lines connecting to a plurality of customer sites, the method comprising:
   providing power to a plurality of communication devices respectively and communicatively associated with the plurality of customer sites via power lines, and communicating data, by the plurality of communications devices, over the power lines via a customer-site transformer;
   carrying and collecting, on behalf of the power utility company and by a central processing circuit, information derived from the data sent over the power lines from each of the plurality of communication devices, using a broadband communication network for carrying the collected information; and
   using a remoteable data-collector circuit to:
      selectively receive, via a plurality of data interface units of the remoteable data-collector circuit and with each of the plurality of data interface units including a transformer circuit, data from a subset of the plurality of communication devices via the power lines;

selectively send, via a transformer-coupling circuit of the plurality of data interface units, data to the subset of the plurality of communication devices via the power lines;

output, via a high-throughput data driver circuit of the plurality of data interface units, data in accordance with a data-transfer protocol, the data-transfer protocol being common to high throughput data driver circuits of each of the plurality of data interface units; and receive, via a PLC end-point device data computation circuit of the remoteable data-collector circuit, the PLC end-point device data computation circuit having high-throughput data reception circuits, data from each of the plurality of data interface units in parallel and in accordance with the data-transfer protocol, and communicating data with and sending the collected information to the central processing circuit via the broadband communication network, wherein the PLC end-point device data computation circuit includes a plurality of high-throughput data reception circuits and configured and arranged to operate at a location that is remote from the plurality of customer sites, to be communicatively coupled to each of the plurality of communication devices over the power lines via the plurality of data interface units.

9. The method of claim 8, further including generated and outputting, via the central processing circuit, a report based on respective locations of the plurality of data interface units are configured, which identifies one or more respective regions of customer sites associated with a possible power outage event.

10. The method of claim 8, further including processing data, via the plurality of data interface units, with at least one of the plurality of data interface units being located away from the location of the PLC end-point device data computation circuit with the data-transfer protocol characterized in that the at least one of the plurality of data interface units include circuitry configured and arranged to process the data received via the power lines by filtering, providing signal decimation and in response detect data bits therefrom, and transmitting the detected data bits to the computation circuit.

* * * * *